Figure 1:
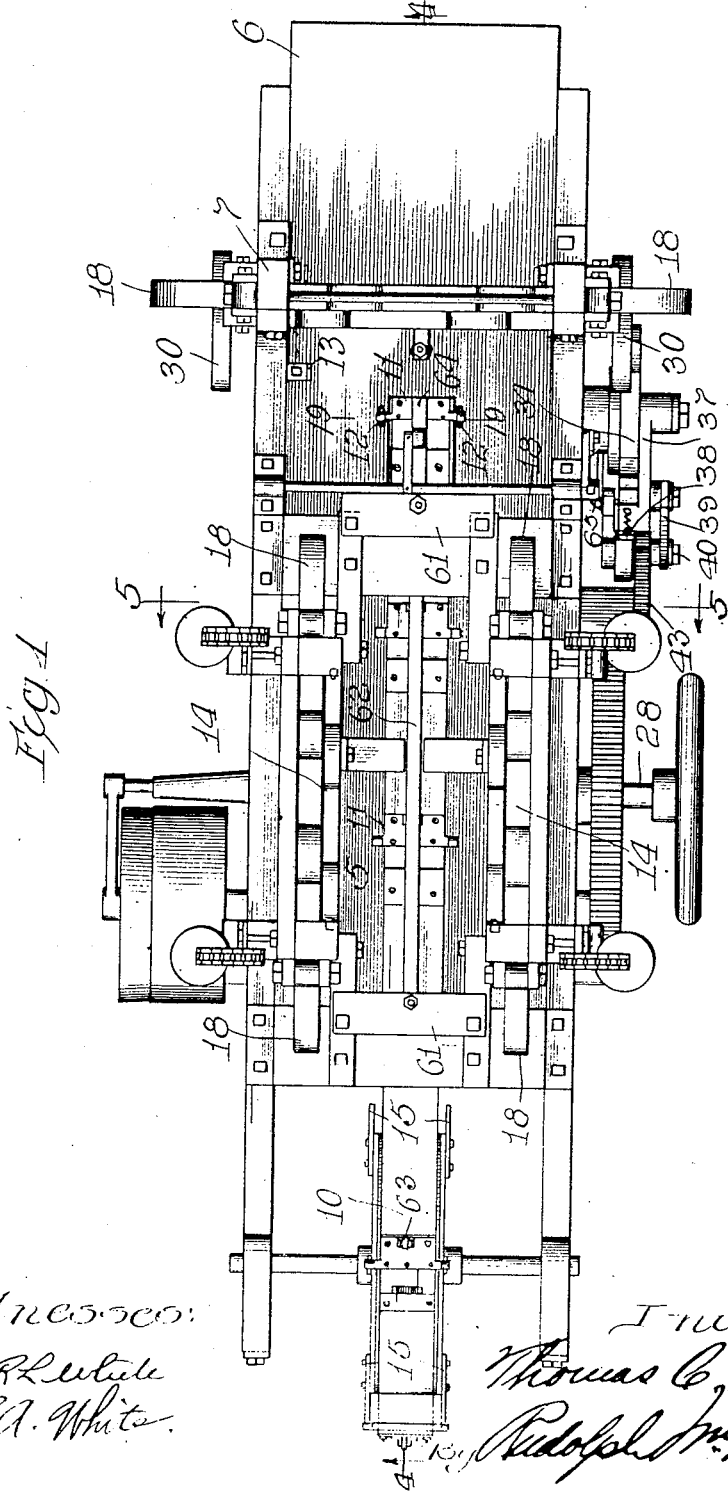
Figure 2:
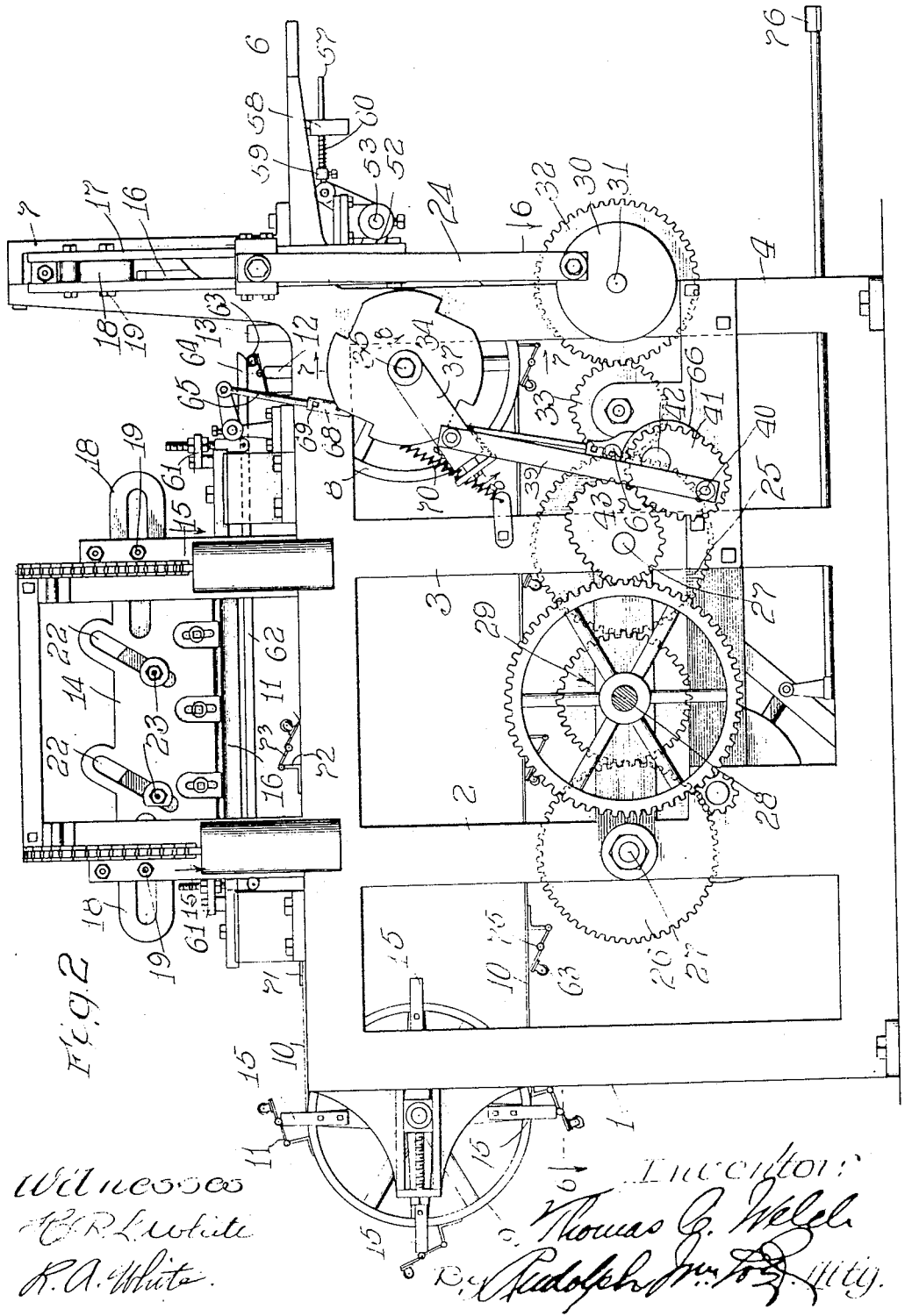
Figure 3:
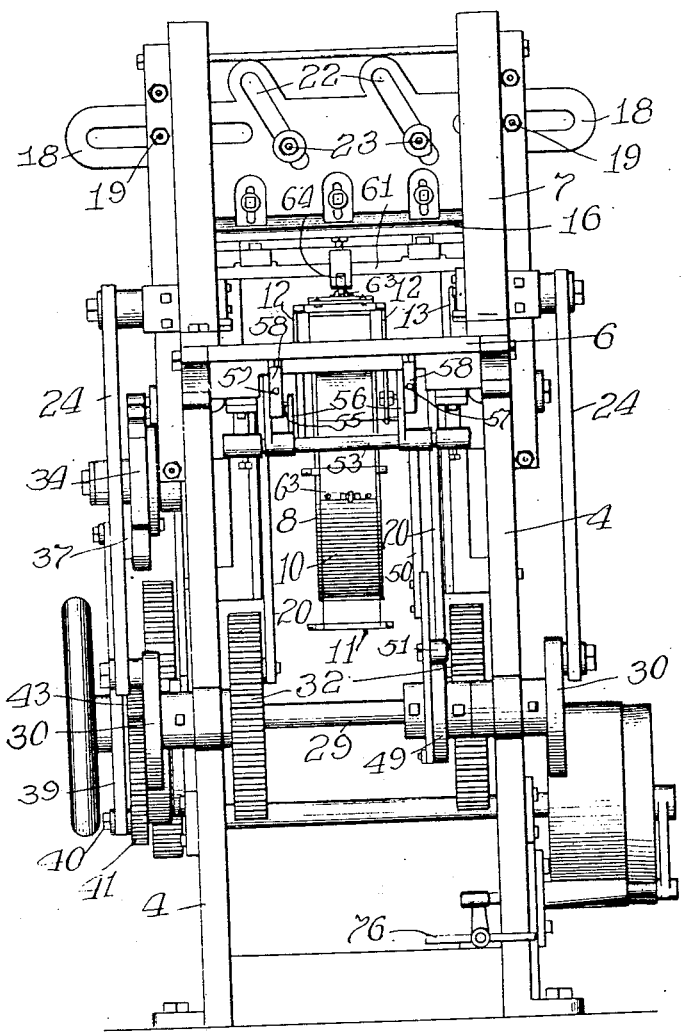
Figure 4:
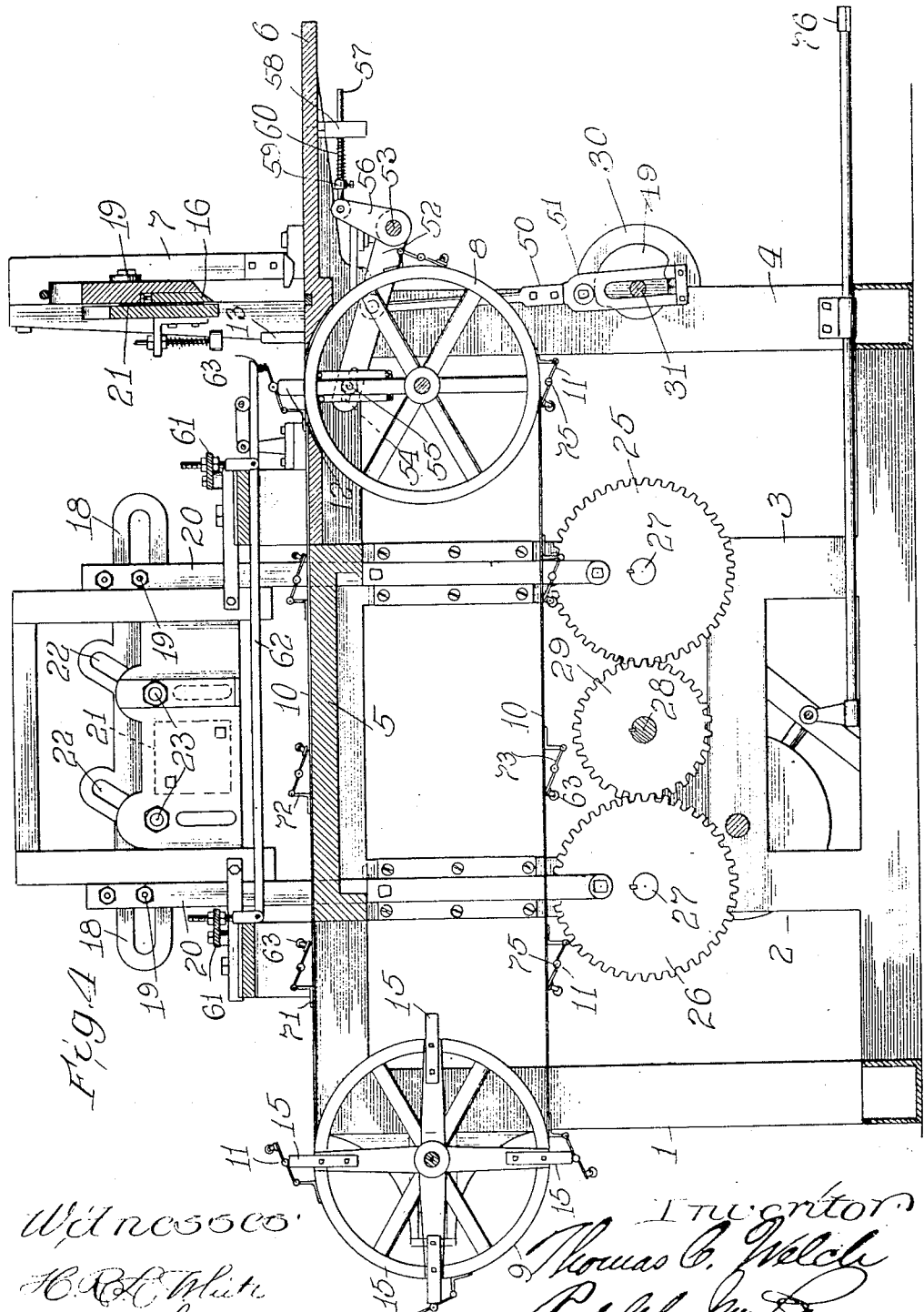
Figure 5:
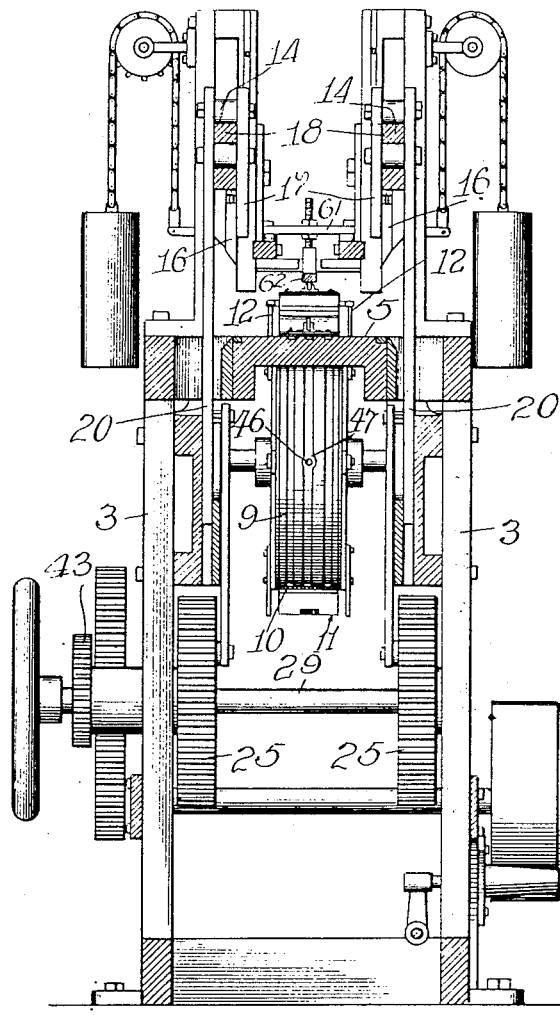
Figure 6:
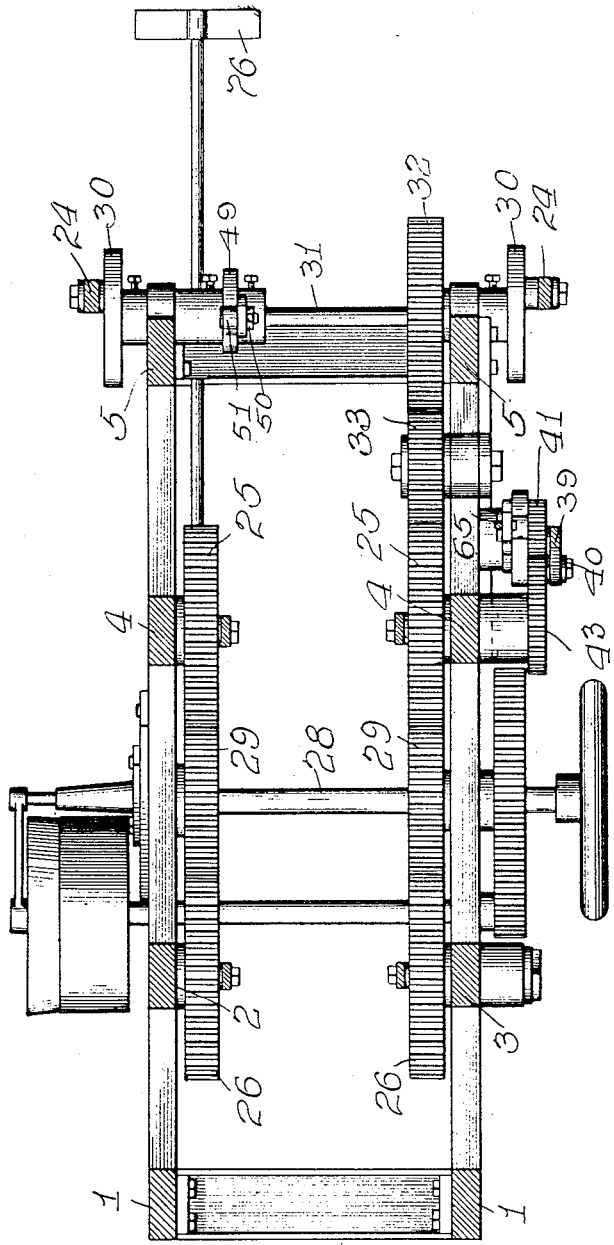

T. C. WELCH.
BOOK TRIMMING MACHINE.
APPLICATION FILED JULY 1, 1909.

1,003,679.

Patented Sept. 19, 1911.
9 SHEETS—SHEET 6.

Witnesses:

Inventor:
Thomas C. Welch

T. C. WELCH.
BOOK TRIMMING MACHINE.
APPLICATION FILED JULY 1, 1909.
1,003,679.
Patented Sept. 19, 1911.
9 SHEETS—SHEET 7.
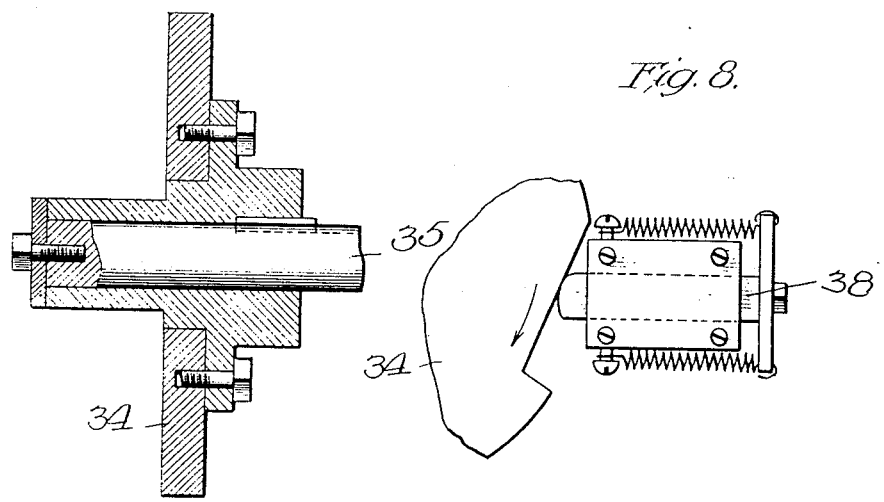
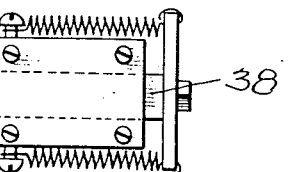
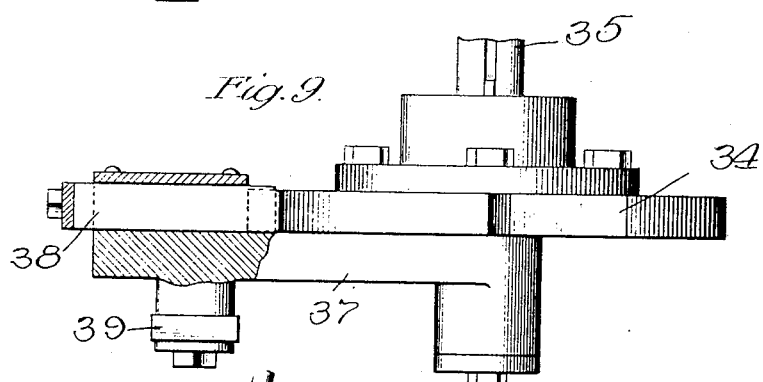
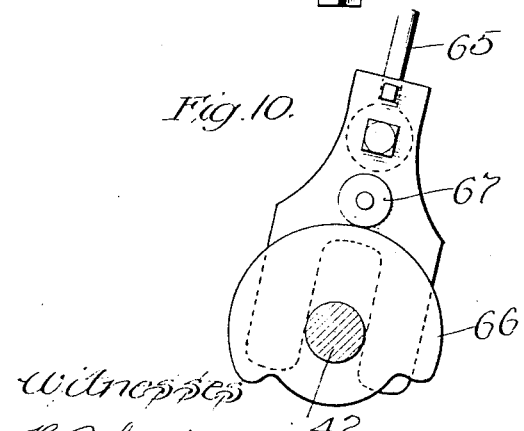
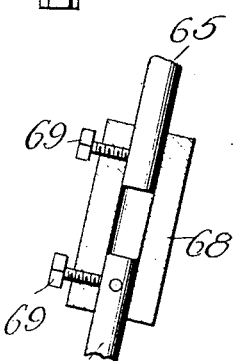

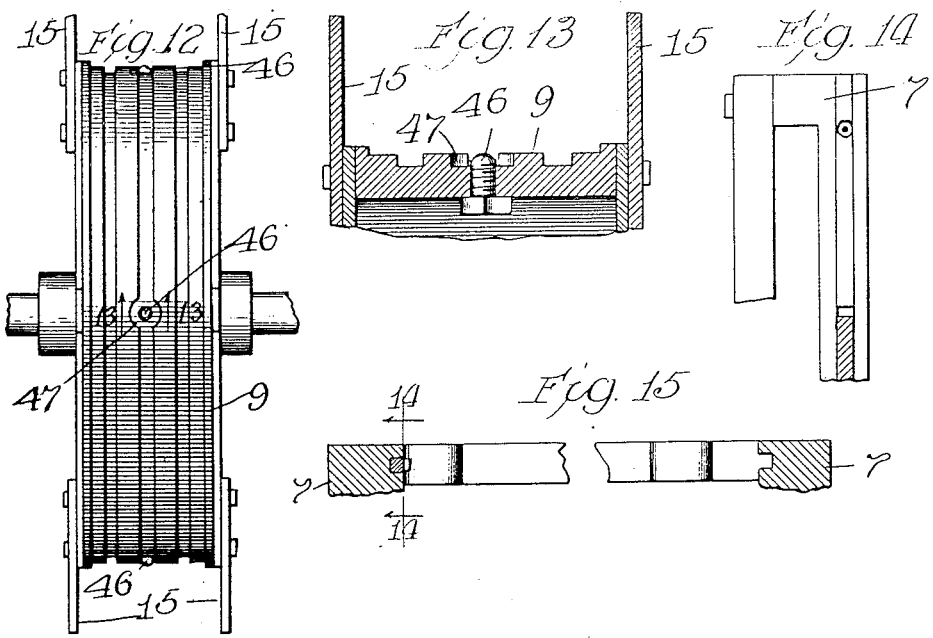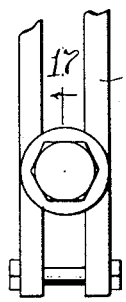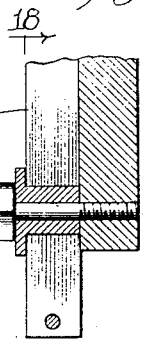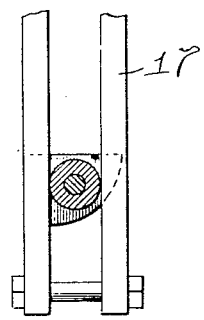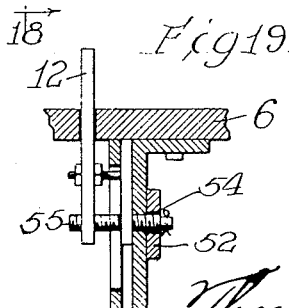

T. C. WELCH.
BOOK TRIMMING MACHINE.
APPLICATION FILED JULY 1, 1909.
1,003,679.
Patented Sept. 19, 1911.
9 SHEETS—SHEET 9.
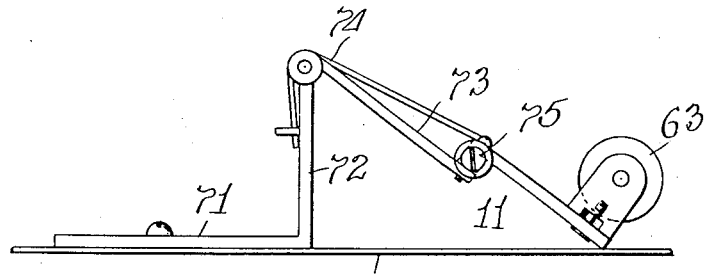
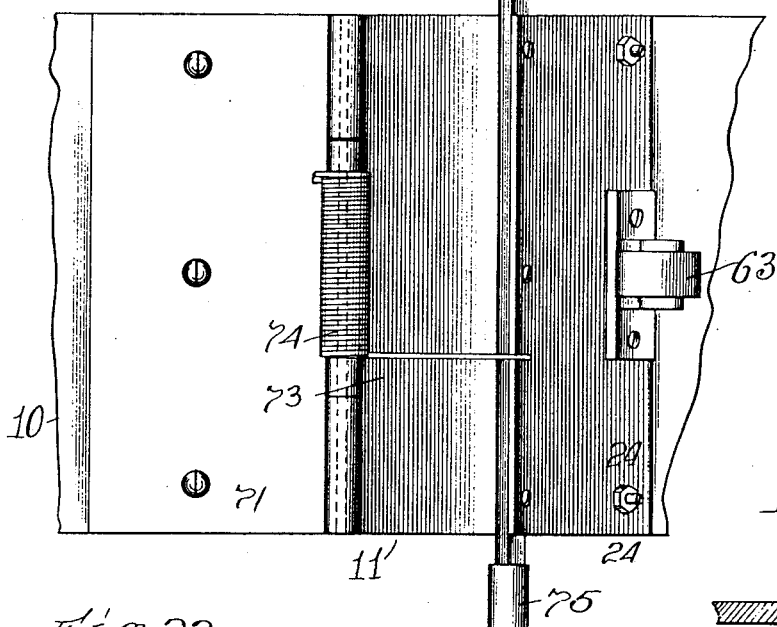
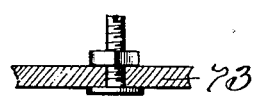
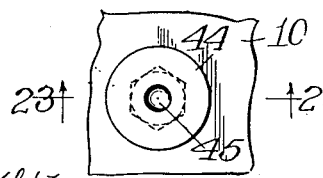

UNITED STATES PATENT OFFICE.

THOMAS C. WELCH, OF CHICAGO, ILLINOIS, ASSIGNOR, BY DIRECT AND MESNE ASSIGNMENTS, TO WELCH AUTOMATIC TRIMMER CO., A CORPORATION.

BOOK-TRIMMING MACHINE.

1,003,679.  Specification of Letters Patent.  Patented Sept. 19, 1911.

Application filed July 1, 1909. Serial No. 505,411.

*To all whom it may concern:*

Be it known that I, THOMAS C. WELCH, citizen of the United States, residing at Chicago, in the county of Cook and State of Illinois, have invented certain new and useful Improvements in Book-Trimming Machines; and I do hereby declare the following to be a full, clear, and exact description of the invention, such as will enable others skilled in the art to which it appertains to make and use the same.

This invention relates to a novel construction in a machine for continuously trimming books, the object being to provide a simple and efficient machine of this character and consists in the features of construction and combinations of parts hereinafter fully described and claimed.

Figure —1— is a plan view of a machine constructed in accordance with my invention. Fig. —2— is a side elevation of the same. Fig. —3— is a front elevation of the same. Fig. —4— is a vertical longitudinal section on the line 4—4 of Fig. —1—. Fig. —5— is a vertical transverse section of the same on the line 5—5 of Fig. —1—. Fig. —6— is a plan section of the same on the line 6—6 of Fig. —2—. Figs. —7— and —8— are fragmentary detail sections on an enlarged scale on the lines 7—7 and 8—8 respectively of Fig. —2—. Fig. —9— is a fragmentary detail rear elevation of the pawl shown in Fig. —8—. Fig. —10— is a detail view in elevation of a cam and guide employed. Fig. —11— is a detail sectional view of an adjustable slip joint in a plunger employed. Fig. —12— is a face view of a pulley employed. Fig. —13— is a detail section on the line 13—13 of Fig. —12—. Fig. —14— is a fragmentary detail section on the line 14—14 of Fig. —15— showing a guide employed. Fig. —15— is a detail plan section on the line 15—15 of Fig. —2—. Fig. —16— is a detail view in elevation of a guide employed. Fig. —17— is a detail section on the line 17—17 of Fig. —16—. Fig. —18— is a detail section on the line 18—18 of Fig. —17—. Fig. —19— is a fragmentary detail vertical section on the line 19—19 of Fig. —1—. Fig. —20— is a fragmentary detail side elevation on an enlarged scale showing a clamp carried by the steel belt on which books are carried through the machine. Fig. —21— is a top plan view of the same. Fig. —22— is a detail plan view of projections on the belt preventing slippage thereof. Fig. —23— is a detail section on the line 23—23 of Fig. —22—. Fig. —24— is a fragmentary detail view on the line 24—24 of Fig. —21—.

In trimming books it is usually necessary to trim the front and end portions and to do this in the ordinary paper trimming machines three cutting operations are required, it being necessary to handle the books between successive operations.

The object of providing special machines for trimming books is to avoid the necessity of handling the books between successive operations, thus saving the time of two operators besides effecting a saving of two-thirds or more of the time required for this work.

Paper is recognized as being very difficult to cut as it is both unyieldingly hard and exceedingly tough, these qualities varying in different grades of paper. To cut paper successfully, a very sharp knife is required and said knife must be operated to draw longitudinally of its cutting edge. The draw-cut is too well-known to require explanation of its merits. The necessity for the draw-cut renders impossible the cutting of two relatively transverse edges of book pad simultaneously and it is, therefore, necessary to provide a plurality of trimming knives relatively so located that the book after being partially trimmed by one knife or pair of knives must be moved into position under the other knife or knives for completion of the trimming operations. It is obviously easier and more practical to move the book relatively to the knives than vice versa.

A book-trimming machine consists, therefore, of a plurality of paper-trimming machines in combination with means for moving books into proper position relatively thereto so that one operation is succeeded by another and a completely trimmed book is delivered from the machine.

All paper trimming machines used during the last several decades produce the draw-cut, and all of such machines are provided with paper clamping devices which bear upon the pads to hold the sheets firmly in position during the trimming operation. In trimming books the said clamping devices are also necessary and constitute an indispensable part of the trimming means. The specific form of clamping devices used is immaterial so long as the same are efficient.

To trim paper relatively great power is required and all operating parts of the trimming devices are required to be very strong and unyielding and all stationary parts, such as cutting bed and knife guides must be equally capable of resisting strains, but it is also desirable that undue weight and bulk be avoided.

My invention consists broadly in providing operative paper trimming means operating on a rigid cutting bed, in combination with book-presenting means movable relatively to the trimming means and the said cutting bed, said presenting means serving only to impart the necessary movement to the book between successive trimming operations to present the edges to be trimmed in proper position relatively to the trimming means.

My invention accomplishes a number of objects, the main one of which is to provide suitable means or devices for imparting movement to the book relatively to the trimming means and cutting bed. By the accomplishment of this main object of my invention I accomplish many minor objects and gain corresponding advantages.

The main advantage gained is that by the use of rigid cutting beds I am enabled to provide guides for the knives which are rigid with and mounted upon the beds and which guide said knives near the horizontal plane of their cutting edges and in the vertical plane of the cut in contradistinction to knife guiding means which are not rigid with the cutting bed and engage the knife carrier at a point relatively distant from the horizontal plane of the cutting edge, and therefore permit of the possibility of deviation of the cutting edge out of the vertical cutting plane, and in which the power is applied to the knife bar at a point relatively distant from its cutting edge.

In carrying out my invention I employ paper trimming means of the most approved pattern placing the same in relative positions to most readily perform their functions, and use in connection therewith book presenting means adapted solely and exclusively to present the books to the trimming means in the proper position to effect the desired result but which at the same time are entirely exterior of the trimming planes.

My said machine comprises a trimming knife for trimming the front edge of a book, said book being positioned under the said trimming knife by hand against disappearing back gages disposed on either side of a carrier upon which the back portion of the book rests during the primary trimming operation and which said carrier is provided with clamps at intervals each of which is successively opened by the disappearing back gages to receive the book and closes automatically to engage the book as the trimming operation is completed and said back gages move out of the path of the book. The said carrier then carries the book to position between two parallel trimming knives adapted to trim the ends of the book, the end portions of said book being brought into the paths of said knives by the said carrier. The last-named trimming knives make the trimming stroke practically simultaneously with each other and the front trimming knife, the said knives being relatively timed to follow each other in quick succession in order to decrease the primary strain on the machine due to starting the cut. The book is then carried to the other end of the machine where the clamps are opened and the book released and whence it is taken by an operator and stacked.

In its preferred form the machine is rendered adjustable to accommodate books of various sizes and in providing for such adjustability the method or mechanism for clamping the books and certain details of the operating mechanism of the machine are necessarily varied considerably from what is shown in the drawings forming part of this application. The said drawings illustrate merely a suitable embodiment of my invention for trimming books of a certain or to a certain fixed size, such for example, as a magazine or other periodical which is issued monthly or weekly in large editions and the size of which does not vary. To render a machine adjustable requires only the exercise of mechanical skill though sometimes of a very high order, and while I have not herein illustrated the machine in its adjustable form, I nevertheless claim the same as included as a part of my present invention as well as such modifications in the mechanism employed as lie within the scope of the appended claims.

The machine permits of many modifications without departing from the broad conception of the invention as above outlined and defined in the appended claims but in selecting the design of machine illustrated and described herein I have kept in mind particularly adherence to simplicity and durability of construction and the maintenance of travel of the book in a direction at an exact right angle to one trimming plane and exactly parallel with the other trimming planes in order to properly trim the books at all times and render practically impossible any variation from the true square trim even in the face of wear.

Besides accuracy of operation I have also kept in mind speed, upon which depends the value of all labor saving machines and in the selection of means for accomplishing the desired results I have selected mechanism which may be very rapidly operated without strain or jar thereon and which does not necessitate the employment of an undue number of parts and complicity of movement as I recognize that the greater the number of parts, the greater is the liability to disorder and the less the speed and efficiency.

My said machine comprises a suitable frame consisting of vertical standards 1, 2, 3 and 4 arranged in pairs on opposite sides of the machine and upon which a rectangular table 5 is suitably carried. At one end of the machine is a feed table 6 and on either side thereof are the standards and guides for a trimming knife 7 for trimming the front edge of a book.

Midway between the sides of the machine are suitably mounted two pulleys 8 and 9 respectively over which a steel belt 10 is trained. The front portion of the table is slotted to permit the passage of said belt over said table upon which it rests during its travel from the pulley 8 to the pulley 9. On said belt or carriage are mounted a plurality of spring actuated clamps 11 each of which is maintained normally closed and in which the books to be trimmed are received and engaged. The construction in detail of said clamps will be hereinafter more fully described. Vertically reciprocally movable through openings in the table on either side of the slot through which said belt 10 passes are gages 12 which perform the function primarily of successively opening each of the clamps 11 and at the same time determine the position of the book under the trimming knife first-mentioned. A side gage 13 is provided against which one end of the book abuts to determine its position in one direction.

The belt 10 is moved at intervals a distance equal to that between two adjacent clamps 11 and after the first primary trimming operation is completed, at which time the first clamp 11 closes at the same time that the stops 12 move downwardly out of the path of the book, the latter is moved a distance equal to the aforesaid movement of the belt and another book is then inserted to be trimmed on its front edge. The belt then makes a second movement during which the first book is brought in position underneath the side trimming knives 14 and is then trimmed at its ends. After the third book has been inserted into the machine a book is fully trimmed at each operation. Adjacent the pulley 9 and rigid therewith are projecting radially disposed arms 15 which engage the clamp 11 as the latter approaches the rear end of the machine and open the same to release the books.

The foregoing brief description of the operation of the machine is given in order to facilitate a clear understanding of the mechanism employed and which I will now proceed to describe.

Each of the trimming knives comprises the knife bar 16 which is reciprocally movable in guides 17 between which said bar is received and held. The knife bar is provided at its ends with projections 18 each of which is horizontally slotted and in said slots are received projections 19 carried by the vertically reciprocating members or plungers 20 by means of which the said knife bar is vertically reciprocated. Frictionally mounted on each knife bar is a paper clamp 21 which moves in unison with the said knife bar during a part of the stroke of the latter. Suitable means are provided for adjusting the frictional engagement of said clamp with said knife bar in a manner well-known in the art, said clamp 21 being adapted to move downwardly with the knife bar until it contacts with the book pad whereupon its motion is arrested and the book pad compressed thereby to an extent sufficient to overcome the resistance to relative movement between said clamp and said knife bar. Said clamp is further provided with parallel slots 22 disposed at an incline and engaged by projections 23 suitably bolted or otherwise secured to the knife bar and entering said slots, the latter serving to guide said knife at an incline during its vertical movement in order to produce a draw-cut. This construction of knife bar and clamping plate is old and well-known in the art and constitutes no part of my present invention. The object of the inclined slots 22 as is well-known is to not only cause the knife to descend on an incline for the purpose of producing a draw-cut but the pressure on the knife on the clamp bar due to its being guided by said slots so far increases the pressure of said clamp 21 on the book pad as to firmly hold the latter. The construction of the side trimming knives is exactly the same as the front trimming knife with the single exception that the inner guide rails of the side trimming knives are cut away above the plane of the table a sufficient distance to permit the passage of book pads underneath the same, this being necessary in order to bring the ends of the book into the path of the cutting edges of said side trimming knives as will be obvious. The usual cutting sticks are provided in the table. The said trimming knives are operated in the usual manner by means of cranks on rotating members connected by means of pitmen 24 with said knife-bars in any well-known and usual manner. The cranks actuating the side trimming knives are disposed upon the inner faces of spur gears 25 and 26 disposed on short shafts 27 journaled in the standards 3 and 2 respectively of the machine, said spur gears being each geared to the drive shaft 28 of the machine by means of a spur gear 29 on the latter meshing with both of said gears 25 and 26. The cranks actuating the front trimming knife are disposed upon disks 30 on a shaft 31 journaled in the standards 4 of the machine, said shaft carrying spur gears 32 meshing with idlers 33 which in turn mesh with the spur gear 25.

Intermittent movement is imparted to the belt 10 by means of the ratchet 34 rigid with the shaft 35 on which the pulley 8 is mounted, said ratchet having four teeth adapted to be consecutively engaged by the pawl 37 carried by the lever 38 loosely pivoted at one end on said shaft 35 and carrying the said pawl 37 in its free end, the latter being spring actuated (shown in detail in Fig. —8—), and engaging said teeth in a well-known manner. A connecting rod 39 connects said lever 38 with the crank pin 40 on an elliptical gear 41 mounted on a shaft 42 suitably journaled in a bearing on the frame and which meshes with the second elliptical gear 43 on the shaft 27 from which it receives its motion. The purpose of said elliptical gears is to impart movement at varied speed to said belt 10 in a well-known and obvious manner. The said belt is provided at intervals corresponding to the distance between adjacent clamps 11 with projections 44 each of which is provided with a central recess 45 in which the projections 46 on the periphery of the pulley 9 are received and by means of which slippage of said belt on said pulley is prevented. The member 44 fits the enlarged recess 47 concentric with the projection 46 of said pulley 9 and by engagement with the walls of said recess serves also to prevent slippage.

On the forward end of the frame a shaft 31 is mounted and on the same a cam 49 is rigidly disposed. Said cam actuates a plunger 50 having a bifurcated lower end embracing said shaft 48 and provided with an anti-friction roller 51 resting upon the periphery of said cam 49 and being vertically reciprocated thereby. At its upper end said plunger 50 is pivotally secured to an arm 52 of a bell crank lever between the ends of the said arm, said bell crank lever being pivoted at its elbow portion upon a shaft 53 provided therefor. Two of said arms 52 are provided and in the free end portions thereof are longitudinal slots 54 in which the ends of a cross-bar 55 are received, said cross-bar carrying the stops or gages 12 and being movable between vertical guide rails or projections disposed on the lower face of the table of the machine. An arm 56 on said shaft 53 is pivotally connected at its free end with a plunger 57 passing through an opening in a projection 58. On said plunger 57 is a collar 59 between which and said projection 58 a spiral compression spring 60 is disposed which is compressed as said stops or gages 12 are moved upwardly and serves to impart reverse movement to the said shaft 53. The said cam 49 is timed so as to impart movement to said gages 12 upwardly immediately after the belt 10 has completed one of its intermittent movements and has brought another clamp 11 into position to be engaged and opened by said gages 12. At this moment also the first trimming knife is at the upward limit of its movement. The said stops or gages are maintained in their raised positions during the time that the cam 49 completes almost half a revolution and are then suddenly lowered out of the path of the book. The last-named movement follows the completion of the trimming stroke of the knife bar and is immediately succeeded by the movement of the belt 10.

The opposed inner guide members of the side trimming knives are connected together by suitable cross-bars, the latter serving to resist any tendency of the knives or knife bars to move inwardly during the trimming stroke. Said cross-bars are indicated at 61 in the drawings and are very essential to brace the inner rails of the guides as will be obvious. Secured to the said cross-bars is a longitudinal bar or rail 62 adapted to be engaged by anti-friction rollers 63 on the clamps 11 to maintain said clamps closed and in firm engagement with the book pads during their movement through the machine. At the forward end of said bar 62 an extension bar 64 is hinged, the latter lying normally in the path of the anti-friction roller 63 on the clamp opened by the stops or gages 12. In order to firmly engage the books in said clamp I prefer to impart a primary depressing movement to said extension member 64, this being accomplished by means of the plunger 65 engaging said member 64 at one end and which at its other end engages a cam 66 disposed on the shaft 42 (shown in detail in Fig. —10—). The lower end of said plunger 65 is bifurcated and embraces said shaft 42, said plunger being equipped with an anti-friction roller 67 riding on said cam and moved thereby. In order to accommodate books of varying thickness the said plunger 65 is capable of being adjusted in length, this being effected by dividing the same between its ends and receiving the end portions in a sleeve 68 and there securing the same by means of the set-screws 69. A spring 70 maintains said plunger 65 normally at the lower limit of its movement and immediately upon lowering the stops or gages 12 said plunger will be drawn down by said spring 70 and thus depress the free end of the clamp 11 into firm engagement with the book pad. The said bar 62 may, by reason of its being slightly lower than the free end of the member 64 is moved by the plunger 65, impart a further pressure to the clamp 11 and maintain such pressure during the passage of said clamp underneath said bar. The book pad is thus firmly held during its presentation to the side trimming knives of the machine and all leaves are maintained in proper relative position from the time of completion of the primary trimming operation until the delivery of the book from the machine.

Each of the clamps 11 comprises an L-shaped member 71 one flange of which is riveted or otherwise secured upon the belt 10 while the other arm 72 thereof projects at right angles to the plane of said belt and at its free end carries a hinged leaf 73 which is maintained normally depressed by means of a spring 74 in a well-known manner. Between its pivot and its free end said leaf 73 is provided with side projections 75 which are adapted to be engaged by said stops or gages 12 to raise said leaf to receive a book and are also adapted to be engaged by the said projections or arms 15 on the shaft of the pulley 9 to release the books.

The drive shaft of the machine carries a clutch member rigid therewith and which is adapted to engage a clutch member loosely mounted on said shaft and geared to a source of power, said clutch members being drawn into engagement with each other by means of a foot-operated lever 76. Any suitable cflutch may be employed as will be ovbious.

In its preferred form the machine is constructed to render the same adjustable to vary the distance between the stops or gages 12 and the trimming plane of the front trimming knife and also to vary the distance between the trimming planes of the side trimming knives. The means for effecting such adjustment is not herein illustrated and in order to effect the same it is convenient to obviate the use of said clamps 11 and in place thereof employ a second belt which travels over pulleys disposed in the upper portion of the frame-work above the table of the machine and between which said belt and the belt 10 the books are received and compressed. The said pressure may be effected by means of spring actuated plungers or by training said belt or belts so as to cause them to converge at the point where engagement with the book pad is effected or both. It is essential to the successful operation of the machine that the cutting beds shall be absolutely rigid with relation to the knife guides and that all possibility of the springing of the knives out of the trimming plane shall be prevented and the power applied to said knives as nearly as possible in horizontal alinement with the cutting edge thereof. Owing to the tremendous resistance offered by paper to the trimming knives it is essential that the latter should be guided as nearly as possible continuously along the plane of the cutting edge thereof and this can be effected only by extending the guides down to the cutting bed. To this end the inner rails of the guides should terminate no farther above the cutting bed than is necessary to permit the passage of book pads of maximum thickness.

In order to enable books of relatively little width to be trimmed in the machine the distance between the stops or gages 12 and the front trimming knife must be reduced to accord with the desired width of book. By crowding these members toward each other it would be obvious that the space between the cutting bed of the front trimming knife and the belt would become too small to permit of the passage of clamps 11 therethrough without greatly weakening the cutting bed. Accordingly in order to render the machine adjustable to handle books which are very narrow as well as books which are relatively very wide it is necessary to provide means other than the clamps 11 to engage said books, as for example, clamps which when idle fold down in close contact with the belt so as to occupy little room. The clamps 11 furthermore would handle books or book pads only to a limited depth and in order to provide for the handling of book pads of greater thickness than could be received by the clamps 11 it is necessary to provide means for adjusting the depth of space in which the books are received. This can be very well effected by the use of the second belt above referred to and which may be raised and lowered by raising and lowering the pulleys over which it is trained.

It is very desirable that a machine of this character should be operated with relatively great rapidity and in order to effect this it is necessary to provide for as little loss of time as possible between successive operations. But it is also desirable to guard against possible accident to the operator. In the machine as illustrated the operator would be obliged to bring his hands relatively very close to the trimming knife in inserting the books and there is always danger, especially in view of the known carelessness of the operators, of failure to draw his fingers from the trimming plane in time to avoid having them trimmed along with the book. It is therefore desirable that means should be provided which will obviate the necessity of the operator's hands coming sufficiently close to the trimming plane to endanger him this being capable of accomplishment in several ways.

The machine herein illustrated shows the side trimming knives moving at an incline toward the back of the book, and that I propose to reverse as it is more advantageous to trim toward the front edge of the book in order to prevent tearing the rear portion of paper bindings on the books.

The above outlined variations in construction and operation render necessary some changes in gearing, etc., all of which however, are relatively easily effected.

My invention is, I believe, essentially novel in the provision of means whereby the book is fed by hand upon the carrier and in proper position to receive the primary trim before its engagement by said carrier, the latter serving only to present the book to the knives for trimming the ends thereof. This mode of operation enables me to employ rigid cutting beds for all the trimming knives as distinguished from traveling cutting beds, and permits the employment of the draw-cut without which a paper trimming knife cannot be successfully operated as is well known.

I claim as my invention:

1. A book-trimming machine comprising in combination, a plurality of trimming devices operating on different parts of a book, gaging means disposed adjacent one of said trimming devices and determining the primary position of the book, an intermittently moving carrier first engaging said book in its primary position and carrying the same into the path of the remaining trimming devices, and means actuating said gaging means to throw the same out of the path of said book upon completion of the primary trimming operation.

2. In a book-trimming machine, the combination with a plurality of trimming devices each operating on its own cutting bed, and a carrier for books transporting the same from one to another of said trimming devices, of movable gages disposed adjacent one of said trimming devices in the path of the book and determining the position of the book on the carrier and with relation to the primary trimming device, means imparting intermittent movement to said carrier, and means withdrawing said gages from the path of the book.

3. In a book-trimming machine, the combination with a plurality of trimming devices each operating on its own rigid cutting bed, and a carrier transporting the books from one to the remainder of said cutting beds, of movable gages disposed adjacent one of said cutting beds and determining the primary position of the book in the machine and on said carrier, means imparting intermittent movement to said carrier, and means withdrawing said gages from the path of the book.

4. In a book-trimming machine, the combination with a plurality of trimming devices each operating on its own rigid cutting bed, and a carrier transporting the books from one to the remainder of said cutting beds, of movable gages disposed adjacent one of said cutting beds and determining the primary position of the book in the machine and on said carrier, means on said carrier engaging the book therewith, means imparting intermittent movement to said carrier, and means withdrawing said gages from the path of the book.

5. In a book-trimming machine, the combination with a plurality of trimming devices each operating on its own rigid cutting bed, and a carrier transporting the books from one to the remainder of said cutting beds, of movable gages disposed adjacent one of said cutting beds and determining the primary position of the book in the machine and on said carrier, means engaging said book with said carrier, means withdrawing said gages from the path of the book, and means imparting movement to said carrier at intervals following the withdrawal movements of said gages.

6. In a book-trimming machine, the combination with a trimming knife operating on its own rigid cutting bed, trimming knives for trimming other edges of a book and each operating on its own rigid cutting bed, and a carrier transporting books from the first-named to the last-named trimming knives, of means engaging said book with said carrier, intermittently movable gages determining the primary position of the book on the carrier and relatively to the first-named trimming knife, and means imparting intermittent movement to said carrier.

7. A book-trimming machine, comprising in combination, means for trimming one edge of a book, a carrier, means on said carrier engaging said book therewith, additional devices for trimming other edges of the book disposed in the path of said edge portions exteriorly of said carrier, means primarily determining the position of the book relatively to the first-named trimming means and said carrier, and means imparting intermittent movement to said carrier.

8. A book-trimming machine, comprising in combination, means for trimming one edge of a book, a carrier, means on said carrier engaging said book therewith, additional devices for trimming other edges of the book disposed in the path of said edge portions exteriorly of said carrier, means primarily determining the position of the book relatively to the first-named trimming means and said carrier, and means imparting movement to said carrier between the intervals of movement of the trimming means.

9. In a book-trimming machine, the combination with a plurality of rigid cutting beds, trimming knives operating thereon, and a carrier for books, of means engaging a book with said carrier, means determining the position of the book relatively to one of said cutting beds and on said carrier, and means imparting movement to said carrier at intervals alternating with the movements of said trimming knives.

10. In a book-trimming machine, the combination with a plurality of rigid cutting beds, trimming knives operating thereon, and a carrier for books, of means engaging a book with said carrier, means imparting intermittent movement to said carrier, and means exterior of said carrier determining the primary position of the book thereon.

11. In a book-trimming machine, the combination with a plurality of rigid cutting beds, trimming knives operating thereon, and a carrier for books, of means engaging a book with said carrier, means imparting intermittent movement to said carrier, and means exterior of said carrier determining the primary position of the book thereon, and primarily actuating said book engaging means to open same to receive the book.

12. In a book-trimming machine, the combination with a plurality of trimming devices each operating on a different part of a book, one of said trimming devices disposed at the feed point of the machine, and a carrier transporting the book from said last-named to the remaining trimming devices, of means engaging the book with said carrier, and means controlling said engaging means and determining the primary position of the book with relation to said last-named trimming device and said engaging means.

13. In a book-trimming machine, the combination with a plurality of trimming devices each operating on a different part of a book, one of said trimming devices disposed at the feed point of the machine, and a carrier transporting the book from said last-named to the remaining trimming devices, of means engaging the book with said carrier, and means exterior of said carrier controlling said engaging means and determining the primary position of the book relatively to said last-named trimming device and said engaging means.

14. In a book-trimming machine, the combination with a carrier, and means engaging a book pad therewith, of a plurality of rigid cutting beds arranged exteriorly of said carrier and in the plane of travel of one face of the book pad, a trimming knife for each of said cutting beds, and means for simultaneously actuating all of said trimming knives.

15. In a book-trimming machine, the combination with a carrier, and means engaging a book therewith, of a plurality of rigid cutting beds arranged exteriorly of said carrier and in the plane of travel of one face of the book, and a trimming knife operating on each of said cutting beds and each adapted to trim a different edge of the book, one of said cutting beds and its trimming knife arranged to trim one edge of the book prior to its engagement with said carrier.

16. In a book-trimming machine, the combination with a carrier, and means engaging a book therewith, of a plurality of rigid cutting beds arranged exteriorly of said carrier, and a trimming knife operating on each of said cutting beds and each adapted to trim a different edge of the book, one of said cutting beds arranged to trim one edge of the book prior to its engagement with said carrier, devices disposed in the path of the book determining its primary position on the carrier and relatively to the last-named cutting bed, and means withdrawing said last-named devices from said path.

17. In a book-trimming machine, the combination with a trimming knife for trimming one edge of a book, and a pair of trimming knives disposed transversely to the first-named for trimming the ends of the book, each of said knives operating on its own cutting bed, of a carrier traveling between said last-named knives, means engaging the book therewith, and devices actuating said engaging means and primarily determining the position of the book on said carrier and relatively to the first-named trimming knife.

18. In a book-trimming machine, the combination with a rigid cutting bed disposed at one end of the machine, a pair of rigid cutting beds extending transversely to the first-named, trimming knives operating on said cutting beds and each adapted to trim a different edge of said book, of means determining the primary position of the book with relation to the first-named cutting bed, and book presenting means operatively disposed relatively to said pair of cutting beds carrying said book into trimming position relatively thereto.

19. In a book trimming machine, the combination with a carrier for books, and a plurality of cutting beds arranged exteriorly of said carrier in the plane of travel of the book supporting surface thereof, and a trimming knife operating on each of said cutting beds, one of said cutting beds extending transversely to the remainder thereof, of book positioning means arranged exteriorly of said carrier and relatively to said last-named cutting bed for primarily positioning the book relatively thereto prior to its engagement with said carrier.

20. In a book-trimming machine, the combination with a hand-fed trimming knife, and a pair of parallel trimming knives disposed transversely to said hand-fed knife, of devices interposed between said hand-fed and said last-named trimming knives determining the position of the book relatively to the former, a carrier engaging said book and carrying the same into trimming position relatively to said pair of trimming knives, and means throwing said devices out of the path of the book prior to movement of said carrier.

21. In a book-trimming machine, a pair of parallel cutting beds, a carrier traveling therebetween, a cutting bed transversely disposed relatively to said parallel cutting beds, knives operating on each of said cutting beds, clamps on said carrier, movable gages exterior of said carrier determining the position of the book on the latter and relatively to said last-named cutting bed, means operatively actuating said gages to move the same out of the path of the book as the same is engaged by said carrier, and means imparting movement to said carrier between the trimming strokes of said knives.

22. In a book-trimming machine, the combination with a plurality of rigid cutting beds, and trimming knives operating on said cutting beds each adapted to trim a different part of a book, of book presenting means operatively disposed relatively to said cutting beds, and devices on said presenting means engaging the book therewith, said book projecting at its edge portions to be trimmed from said presenting means.

23. In a book-trimming machine, a plurality of cutting beds, a trimming knife operating on each thereof and each adapted to trim a different part of a book, a carrier movable relatively to said cutting beds and trimming knives, and means engaging books with said carrier, said cutting beds adjustable relatively to each other and said carrier to accommodate books of various sizes.

24. In a book-trimming machine, a plurality of cutting beds, guides rigid therewith, trimming knives movable in said guides and operating on said cutting beds, a carrier for books, and means engaging the books therewith, said cutting beds adjustable relatively to each other and said carrier.

25. In a book-trimming machine, a pair of parallel cutting beds, a trimming knife operating on each thereof, each of said knives adapted to trim one end of a book, guides rigidly mounted on said cutting beds and each consisting of parallel rails between which said knives move, the opposing rails of opposite guides terminating above the level of the cutting beds and connected by cross-bars, and a book carrier traveling between said cutting beds, the ends of the books projecting over said beds.

26. In a book-trimming machine, a pair of parallel cutting beds, a trimming knife operating on each thereof, each of said knives adapted to trim one end of a book, guides rigidly mounted on said cutting beds and each consisting of parallel rails between which said knives move, the opposing rails of opposite guides terminating above the level of the cutting beds and connected by cross-bars, and a book carrier traveling between said cutting beds, the ends of the books projecting over said beds, said beds being adjustable relatively to each other and said carrier.

27. In a book-trimming machine, a pair of parallel cutting beds, a trimming knife operating on each thereof, each of said knives adapted to trim one end of a book, guides rigidly mounted on said cutting beds and each consisting of parallel rails between which said knives move, the opposing rails of opposite guides terminating above the level of the cutting beds and connected by cross-bars, a rail supported midway between the ends of said cross-bars and extending parallel with said cutting beds, a carrier movable between said cutting beds, and traveling means maintained by said rail in engagement with the books.

28. In a book-trimming machine, a cutting bed, a trimming knife operating thereon and adapted to trim the front edge of a book, a carrier movable in a direction transversely to the trimming plane, means engaging a book therewith, movable gages determining the position of the book relatively to the trimming plane and said carrier, means withdrawing said gages from the path of the book, said cutting bed and said gages adjustable relatively to each other, and additional trimming means disposed in the path of the book.

29. In a book-trimming machine, a cutting bed, a trimming knife operating thereon and adapted to trim the front edge of a book, a carrier movable in a direction transversely to the trimming plane, means engaging a book therewith, movable gages determining the position of the book relatively to the trimming plane and said carrier, means withdrawing said gages from the path of the book, said cutting bed and said gages adjustable relatively to each other, and additional trimming means adjustable relatively to each other and said carrier disposed in the path of books carried by the latter.

30. In a book-trimming machine, the combination with a plurality of trimming knives each operating on its own bed and each adapted to trim a different part of a book, of a book carrier, means determining the primary position of the book relatively to one of said trimming knives and on said carrier, and a member movable with said carrier and bearing on the books to maintain the same rigid therewith during passage through the machine.

31. In a book-trimming machine, the combination with a carrier for books, and a plurality of cutting beds arranged exteriorly of said carrier and in the plane of the book supporting surface thereof, a trimming knife for each of said cutting beds, each of said knives adapted to trim a different edge of the book, of means for determining the primary position of the book relatively to one of said trimming knives and said carrier arranged exteriorly of the latter, and means on said carrier adapted to engage the book therewith after positioning thereof.

32. In a book-trimming machine, the combination with a carrier for books, of a plurality of cutting beds arranged exteriorly of said carrier, a trimming knife for each of said cutting beds, said cutting beds disposed respectively upon opposite sides and adjacent one end of the plane of travel of the book supporting surface of said carrier, means arranged exteriorly of the said carrier and relatively to one of said cutting beds for primarily positioning the book relatively to said cutting bed and said carrier, means on said carrier for engaging a book therewith, and mechanism actuating said book positioning means and said book engaging means simultaneously to throw the former out of and the latter into engaging relation to the book.

33. In a book-trimming machine, the combination with a carrier for books, of a plurality of cutting beds arranged exteriorly of said carrier and in the plane of the book-supporting surface thereof, and a trimming knife for each of said cutting beds.

34. In a book-trimming machine, the combination with a carrier for books, and means for engaging books therewith, of a plurality of cutting beds arranged exteriorly of said carrier and in the plane of the book-supporting surface thereof, and a trimming knife for each of said cutting beds.

35. In a book-trimming machine, the combination with a carrier for books, of a plurality of cutting beds arranged exteriorly of said carrier and in the plane of the book-supporting surface thereof, a trimming knife for each of said cutting beds, and book clamping means coacting with said cutting beds for clamping said books thereon during the trimming operation.

36. In a book trimming machine, the combination with an intermittently movable carrier, of a plurality of cutting beds arranged exteriorly of said carrier and in the plane of the book-supporting surface thereof, a trimming knife for each of said cutting beds, and book clamping means coacting with said cutting beds for clamping said books thereon during the trimming operation and between intervals of movement of said carrier.

37. In a book trimming machine, the combination with an intermittently movable carrier, and means for clamping books thereon against movement relatively thereto, of a plurality of cutting beds arranged exteriorly of said carrier and in the plane of the book-supporting surface thereof, a trimming knife for each of said cutting beds, and book clamping means coacting with said cutting beds for clamping said books thereon during the trimming operation, said last-named clamping means acting independently of said first-named and between the intervals of movement of said carrier.

38. In a book trimming machine, the combination with a carrier for books, of cutting beds, disposed exteriorly of the path of travel of said carrier on each side thereof and in the path of travel of the books carried thereby, said cutting beds disposed in the plane of the book-supporting surface of said carrier, and a trimming knife for each of said cutting beds.

In testimony whereof I have signed my name in presence of two subscribing witnesses.

THOMAS C. WELCH.

Witnesses:
JAMES ROWE,
RUDOLPH WM. LOTZ.